United States Patent [19]

Alves

[11] Patent Number: 4,811,314

[45] Date of Patent: Mar. 7, 1989

[54] PORTABLE COMPACT DISC PLAYER AND VEHICLE AUDIO APPARATUS WITH SLIDABLE TRAY FOR SUPPORTING COMPACT DISC PLAYER

[75] Inventor: Roger J. Alves, Simi Valley, Calif.

[73] Assignee: Scosche Industries, Inc., Simi Valley, Calif.

[21] Appl. No.: 37,832

[22] Filed: Apr. 13, 1987

[51] Int. Cl.$^4$ .................. H04B 1/20; G11B 31/00; G11B 33/06

[52] U.S. Cl. .......................... 369/10; 369/7; 369/12; 369/75.1; 369/75.2

[58] Field of Search .............. 369/10, 6, 7, 12, 59, 369/75.1, 75.2; 312/8; 108/44

[56] References Cited

U.S. PATENT DOCUMENTS

| | | | |
|---|---|---|---|
| 3,824,472 | 7/1974 | Engel et al. | 369/12 |
| 4,399,528 | 8/1983 | Suzuki | 369/75.1 |
| 4,455,948 | 6/1984 | Torres | 108/44 |
| 4,682,319 | 7/1987 | Einhaus | 369/75.1 |

Primary Examiner—Raymond F. Cardillo
Assistant Examiner—Hoa T. Nguyen
Attorney, Agent, or Firm—William W. Haefliger

[57] ABSTRACT

A vehicle audio system having speaker circuitry and audio circuitry wherein there are a carrier and structure thereon to attach the carrier to a vehicle instrument panel to be supported by the panel; a tray supported by the carrier for movement between extended and retracted positions relative to the carrier and instrument panel; a compact disc player is positioned for removal and retracted portions in which the disc is normally substantially concealed, the player having an output connection; a switching circuit associated with the carrier and having terminals electrically connectible with the speaker circuitry, the audio circuitry and the player output connection. The switching circuitry being manually or automatically operable.

11 Claims, 7 Drawing Sheets

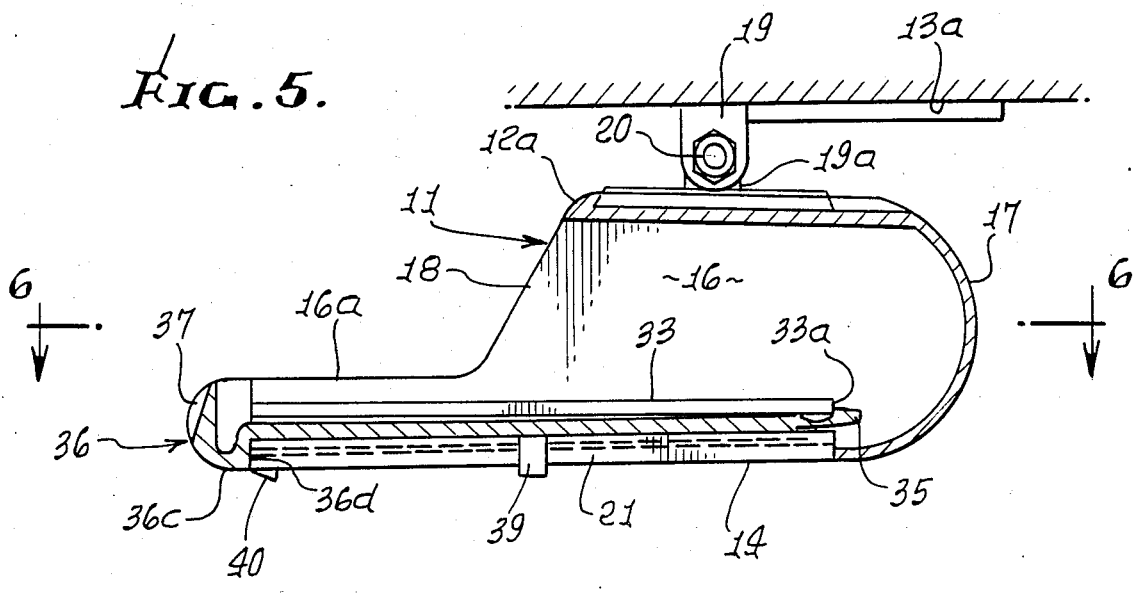
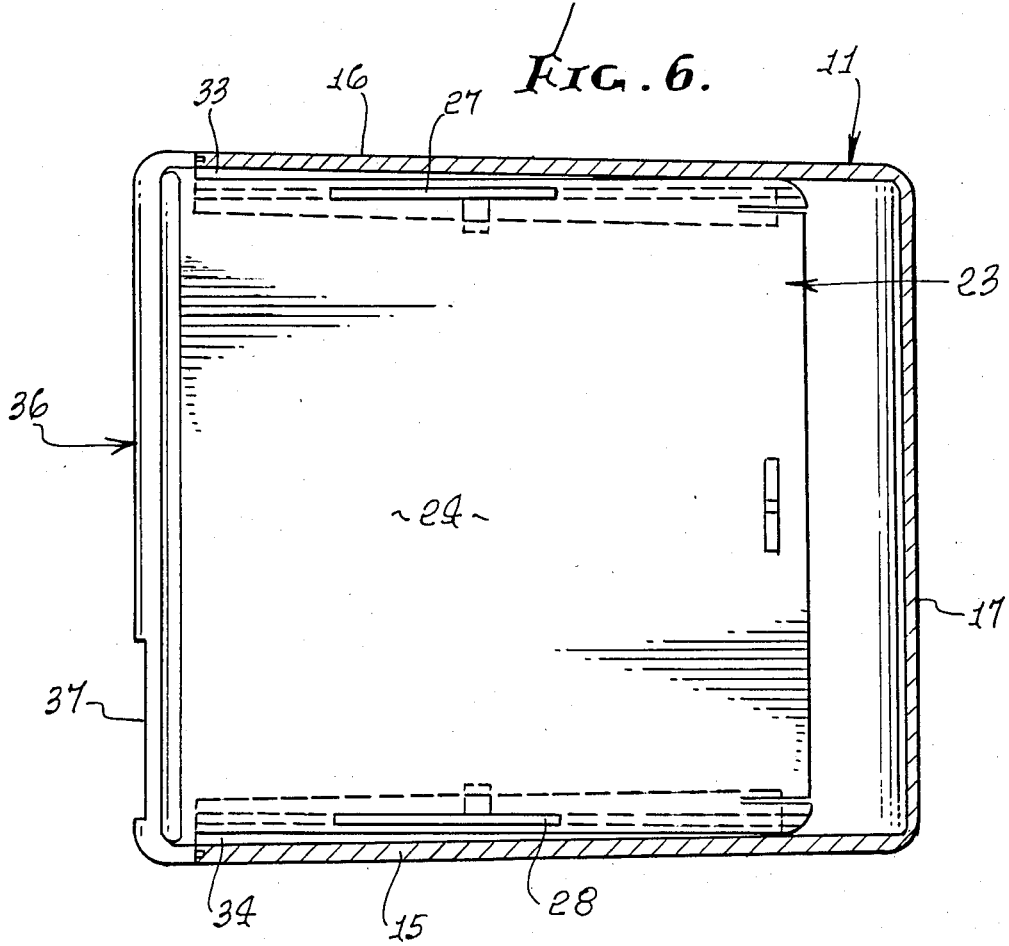

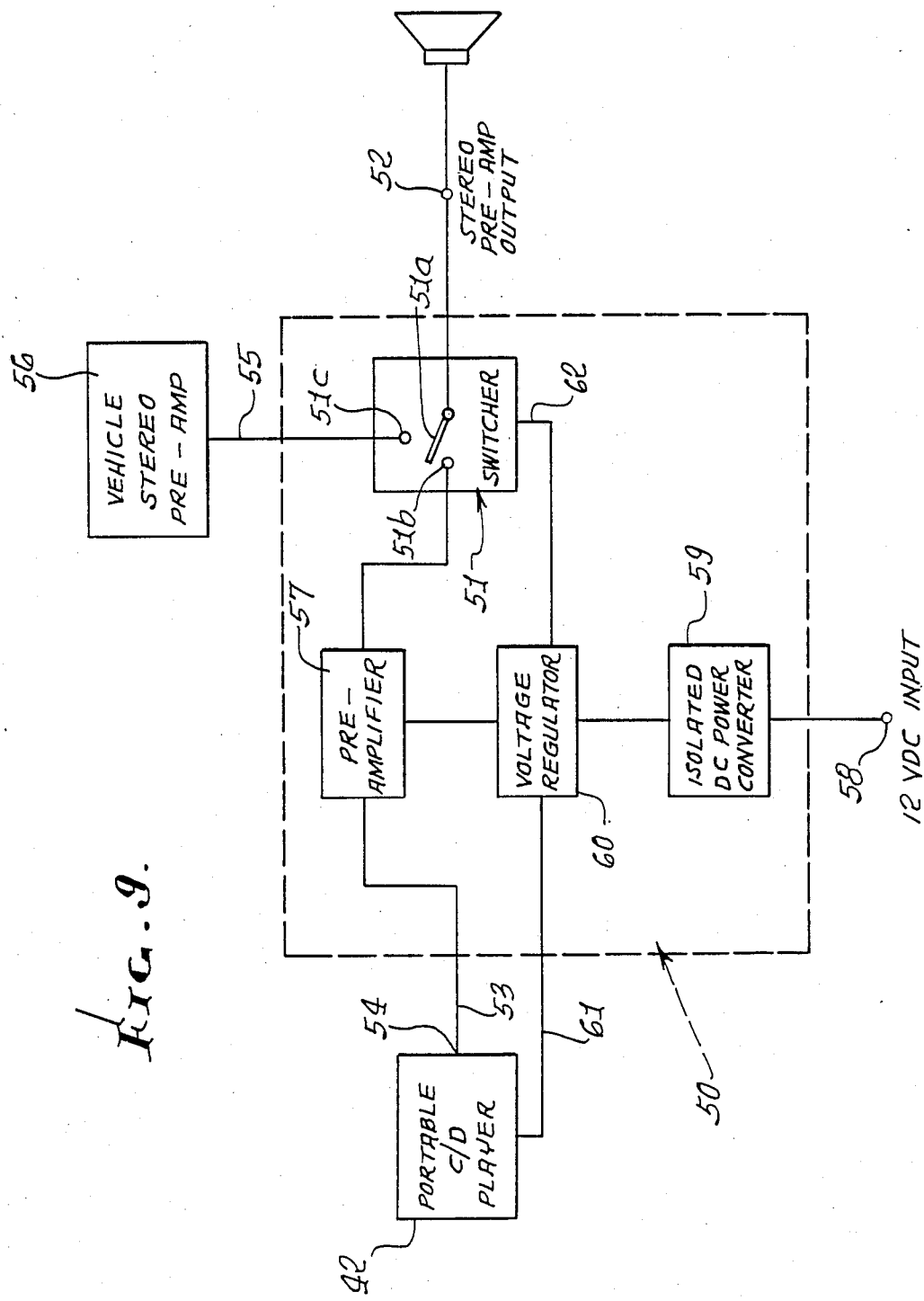

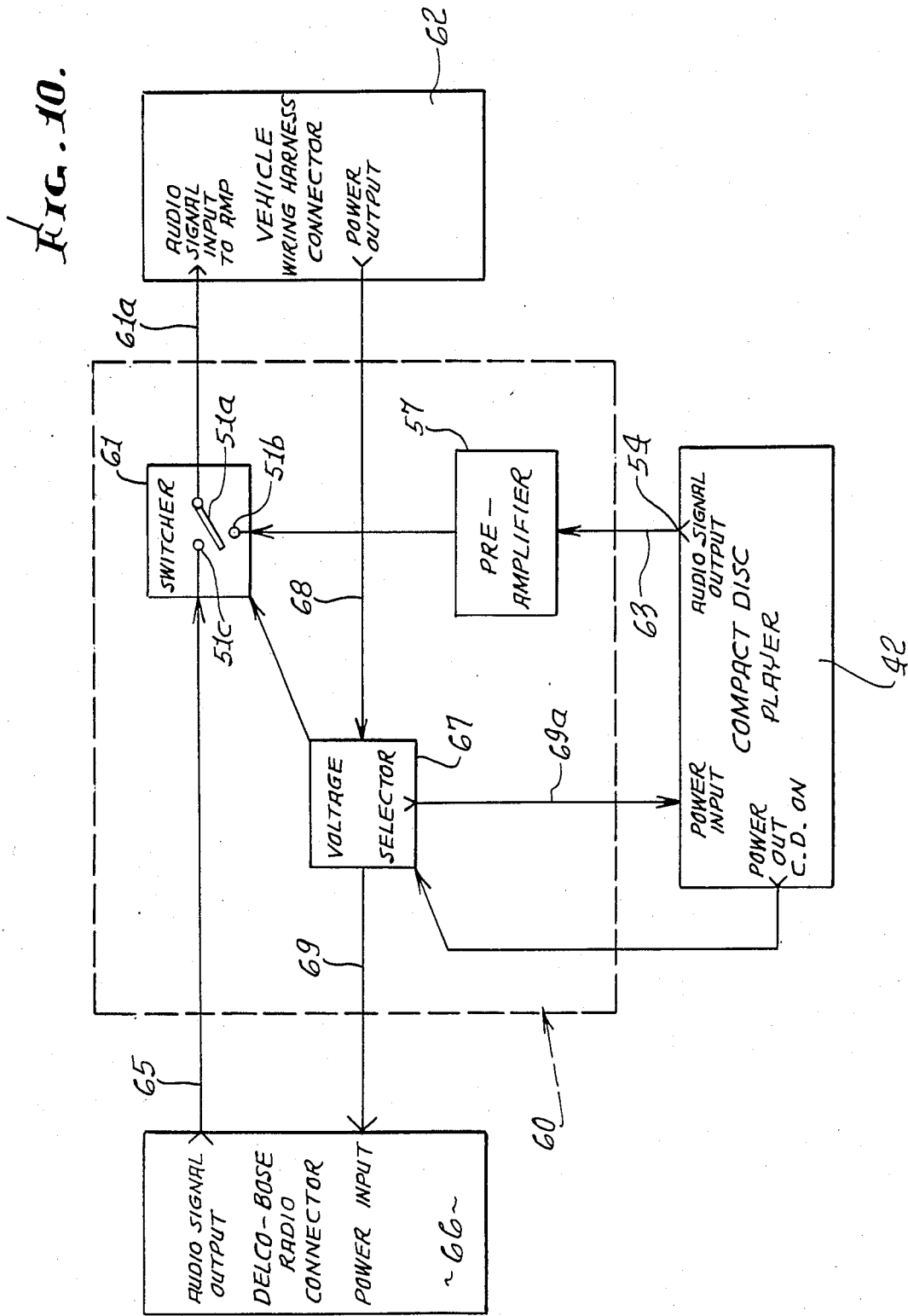

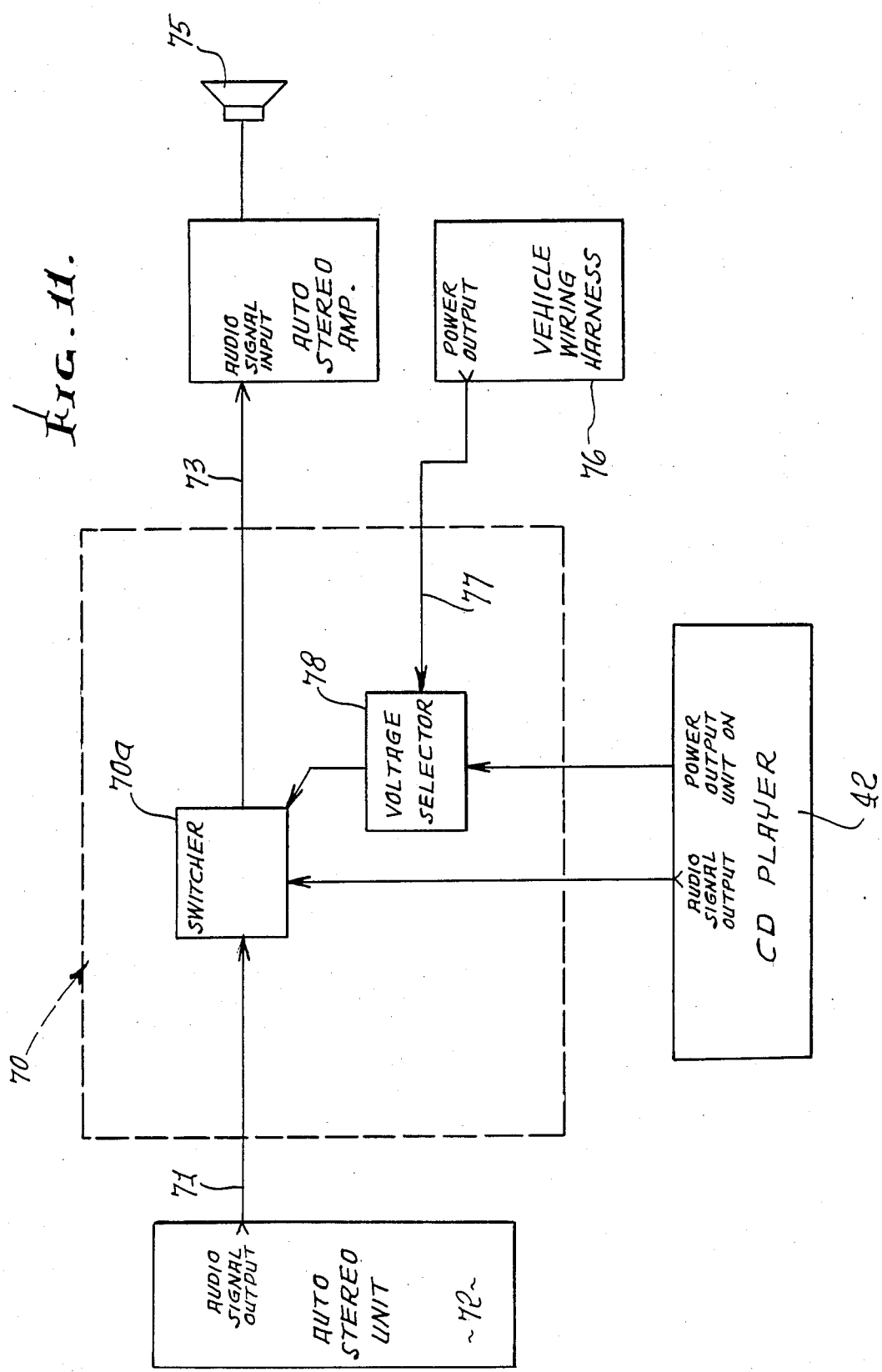

PORTABLE COMPACT DISC PLAYER AND VEHICLE AUDIO APPARATUS WITH SLIDABLE TRAY FOR SUPPORTING COMPACT DISC PLAYER

BACKGROUND OF THE INVENTION

This invention relates generally to use of compact disc players in vehicles, and more particularly to combinations of hardware and circuitry adapting a portable CD player to audio circuitry utilized in vehicles.

Vehicles most commonly have radio and/or stereo circuitry, and speakers, in place; whereas portable compact disc players are not integrated into that circuitry. As a result, the vehicle occupant must turn off his radio or stereo, and turn on his CD player, or vice versa, when he wants to hear one or the other. There is no convenient way to operate one switch to accomplish the changeover, and there is consequently need for such switching equipment; also there is need for positioning the player so that not only is a compact disc readily changeable, but also the player is located in compatable position for a "one-switch" control, as referred to.

SUMMARY OF THE INVENTION

It is a major object of the invention to provide a solution to the above problem, meeting the described need. Basically, the invention is addressed to that solution, and contemplates the provision of a vehicle audio system having speaker and audio (radio or stereo) circuitry, and wherein there is also provided the following:

(a) a carrier, and means thereon to attach the carrier to a vehicle instrument panel to be supported by the panel, (b) a tray supported by the carrier for movement between extended and retracted positions relative to the carrier and instrument panel, (c) a compact disc player supported by the tray for movement therewith between said extended positions in which a compact disc carried by the player is positioned for removal, and said retracted position in which the disc is normally substantially concealed, the player having an output connection, (d) a switching circuit associated with the carrier and having terminals electrically connectible with:
  (i) said speaker circuitry,
  (ii) said audio circuitry, and
  (iii) the player output connection, (e) the switching circuitry being operable to have a first or static position in which the audio circuitry is connected with the speaker circuitry, and a second and alternate position in which the player output connection is connected with the speaker circuitry.

As will appear, the switching circuitry may be at least partly concealed within the carrier to be connected to the CD player placed in the tray; and such placement and locating affords direct access to player controls in both retracted and extended positions of the tray. Also, the carrier may comprise a forwardly and rearwardly elongated housing having upper and lower generally horizontal walls, a rear wall and side walls, the lower wall projecting forwardly to substantially greater extent than said upper wall, the tray supported to move forwardly and rearwardly above said lower wall so that the player supported thereby becomes substantially concealed below said upper wall of the housing in said tray retracted position.

These and other objects and advantages of the invention, as well as the details of an illustrative embodiment, will be more fully understood from the following specification and drawings, in which:

DRAWING DESCRIPTION

FIG. 5 is a view like FIG. 3, showing the tray retracted;

FIG. 6 is a section view on lines 6—6 of FIG. 5;

FIGS. 9-11 are circuit diagrams.

DETAILED DESCRIPTION

Figure 1:
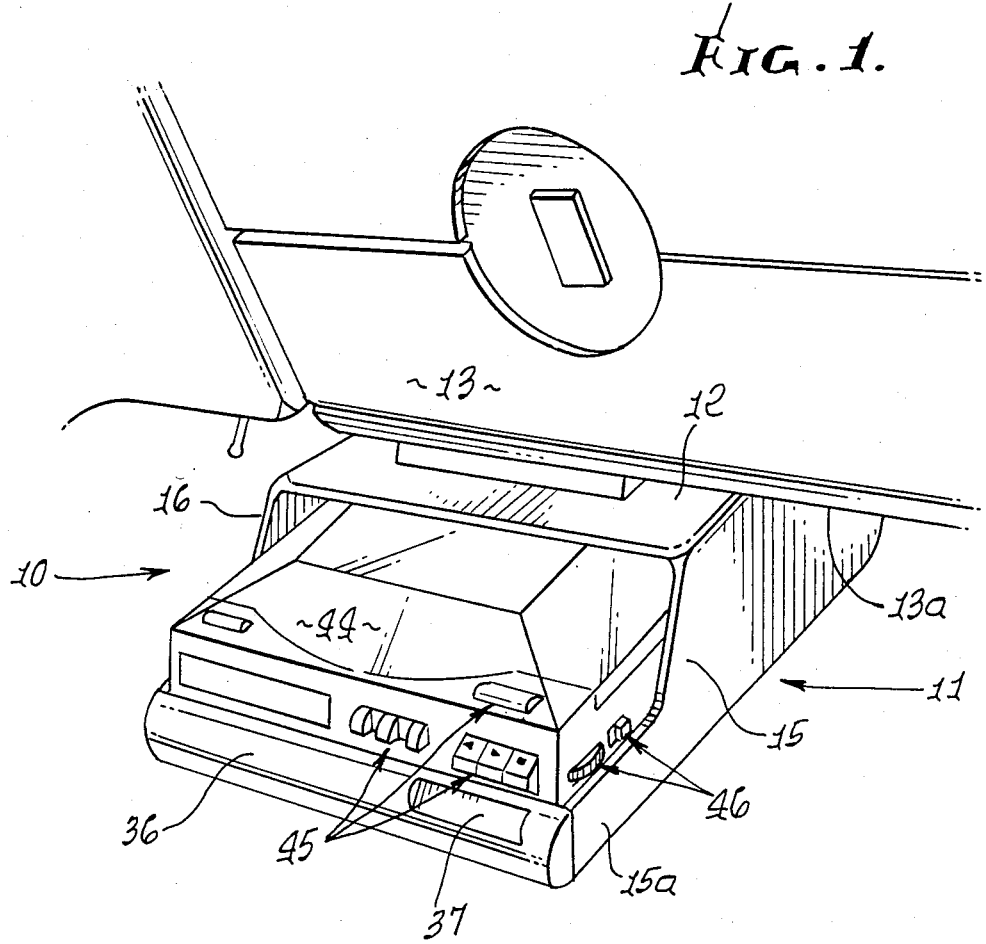
FIG. 1 is a perspective view of a compact disc player holder, as installed to a vehicle instrument panel.
Figure 2:
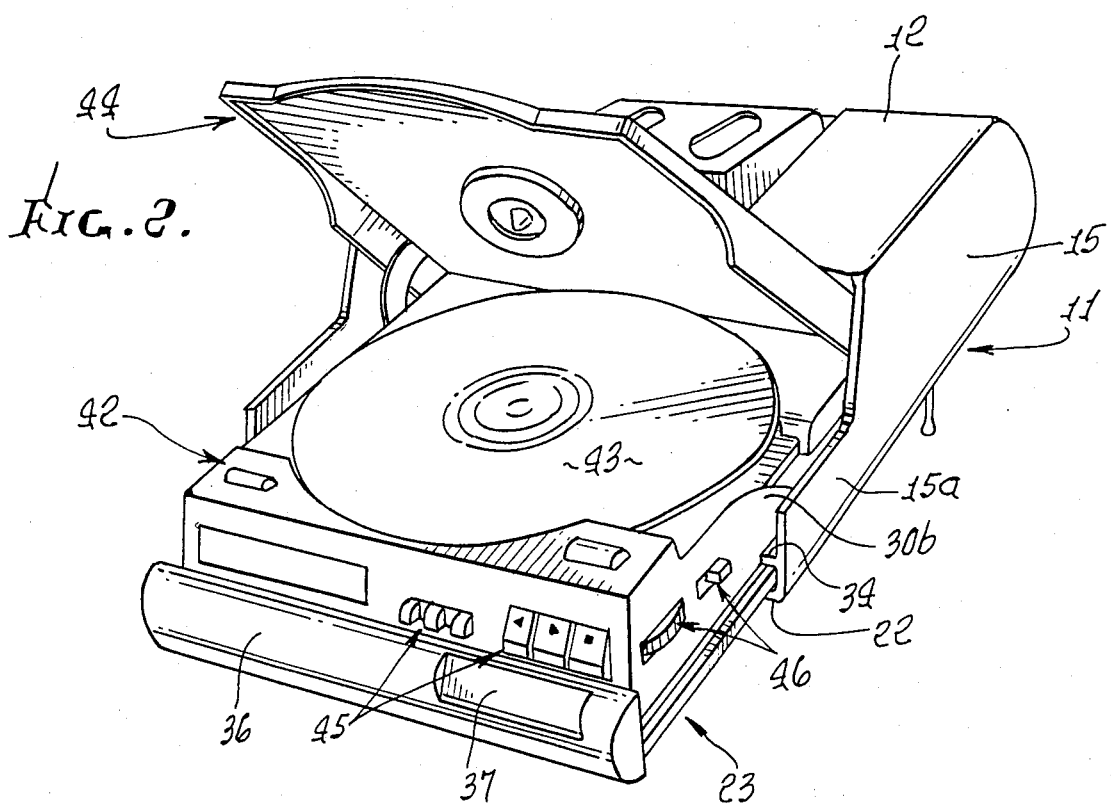
FIG. 2 is a view like FIG. 1, but showing the player tray extended, and a protective lid elevated.
Figure 3:
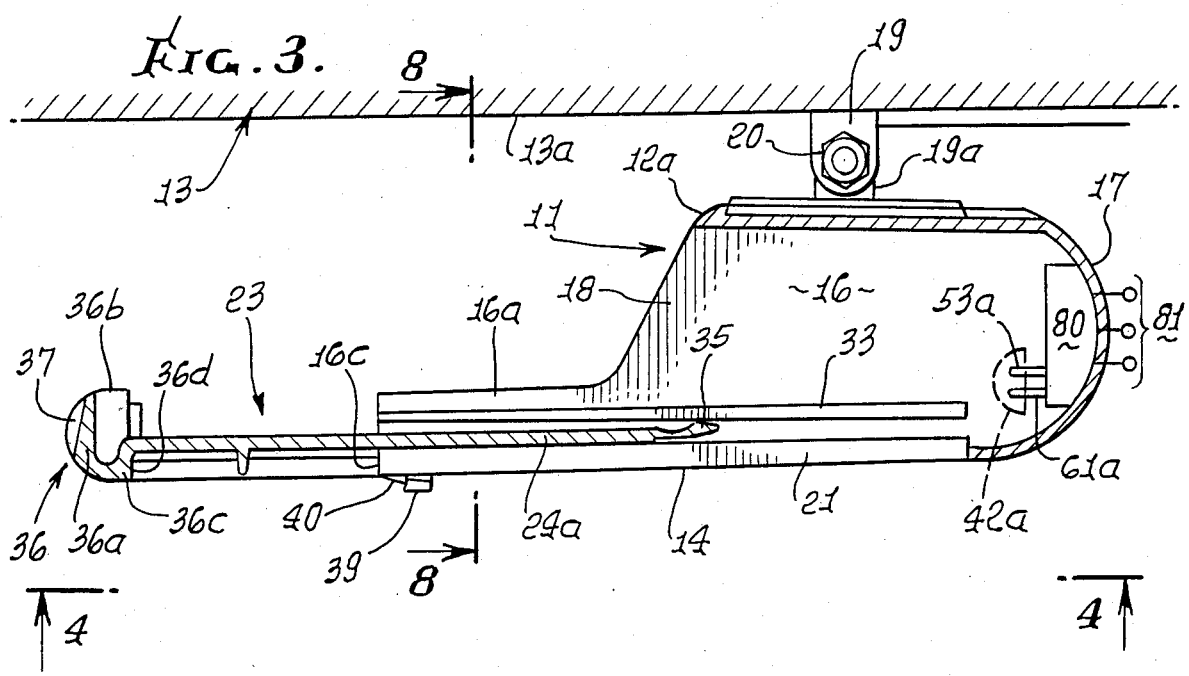
FIG. 3 is a side elevational view, in section, of the holder, with tray extended.
Figure 4:
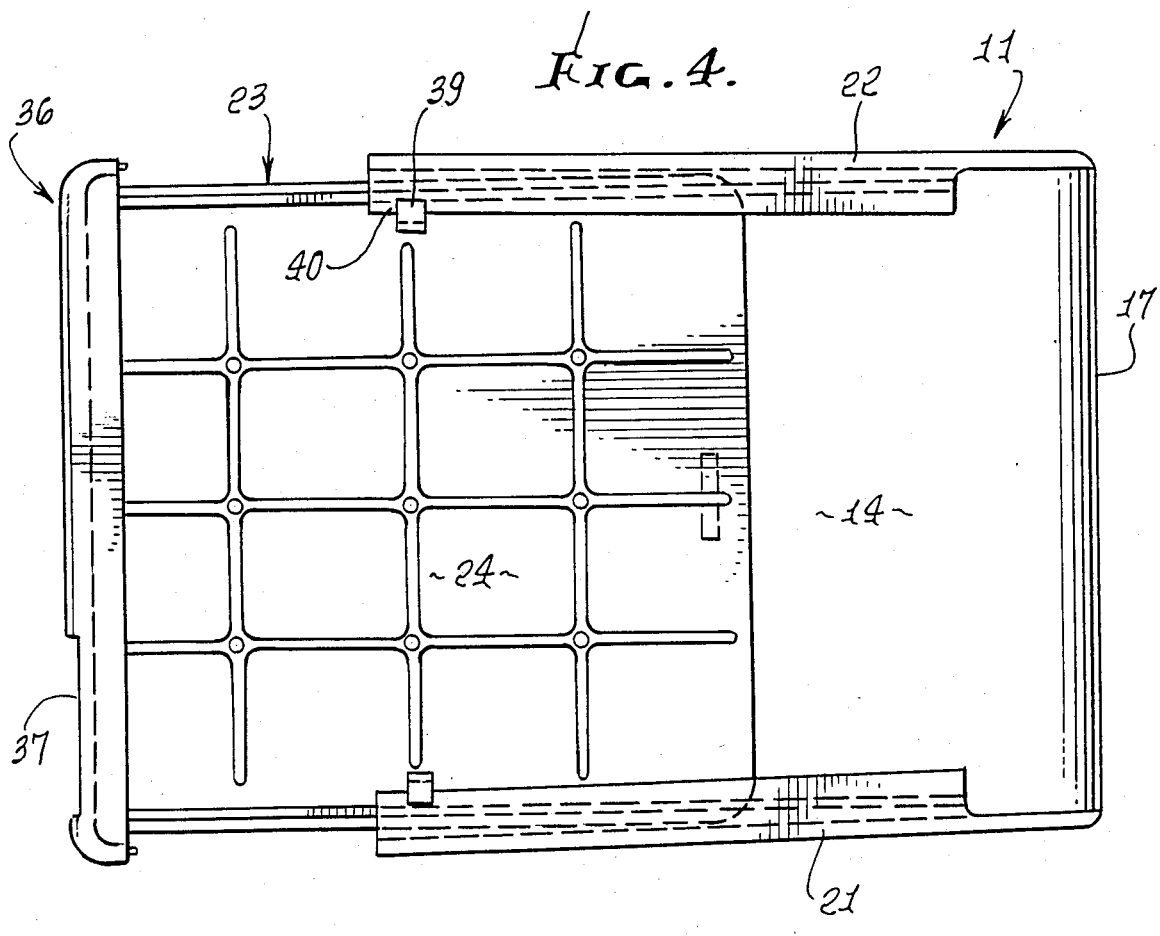
FIG. 4 is a bottom plan view of the holder, on lines 4—4 of FIG. 3.
Figure 7:
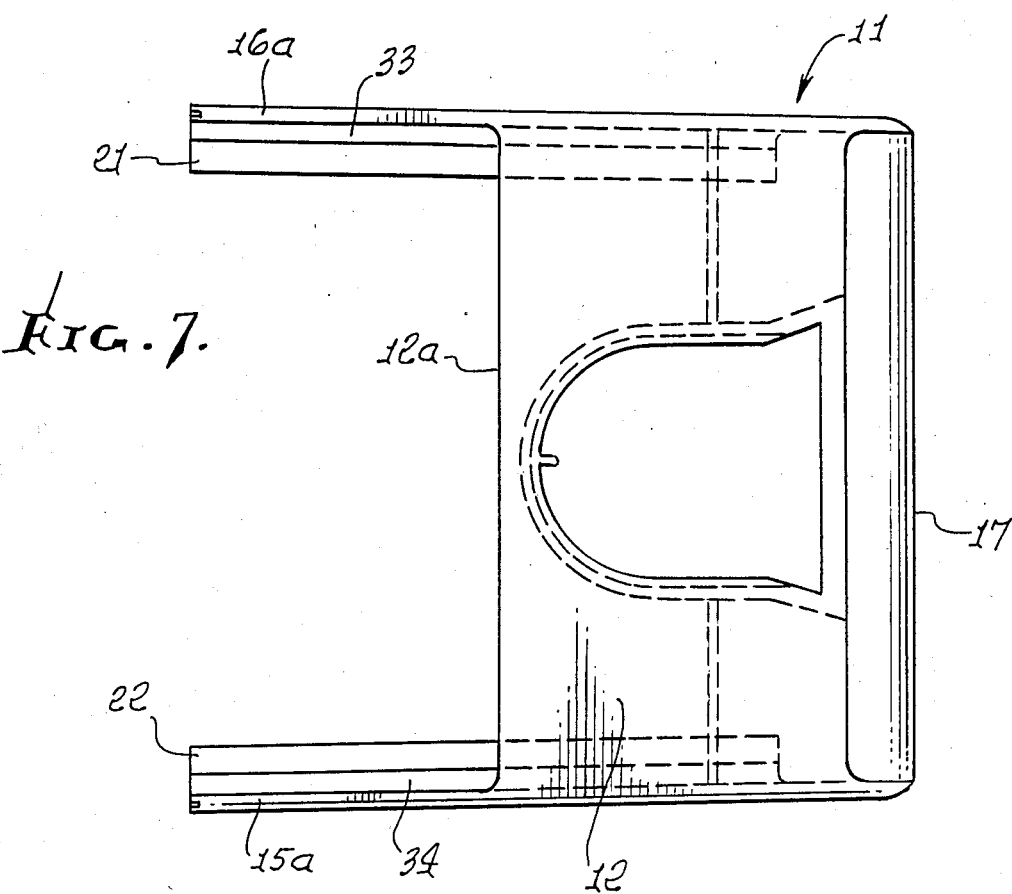
FIG. 7 is a top plan view of the carrier.

In FIGS. 1, 2 and 3, a vehicle audio system 10 includes a carrier 11 having a top horizontal wall 12 attachable to the underside 13a of a vehicle instrument panel 13. The carrier also includes a bottom wall 14, upright opposite side walls 15 and 16, and an end wall 17. Side walls 15 and 16 have reduced height extents 15a and 16a which, together with bottom wall 14, project forwardly away from the instrument panel, and beyond the forward edge 12a of top wall 12. A front opening from the carrier is provided at 18, just below and forwardly of edge 12a. Brackets 19 and 19a connect the top wall to the instrument panel underside 13a, and a fastener 20 connects the brackets together.

Figure 8:
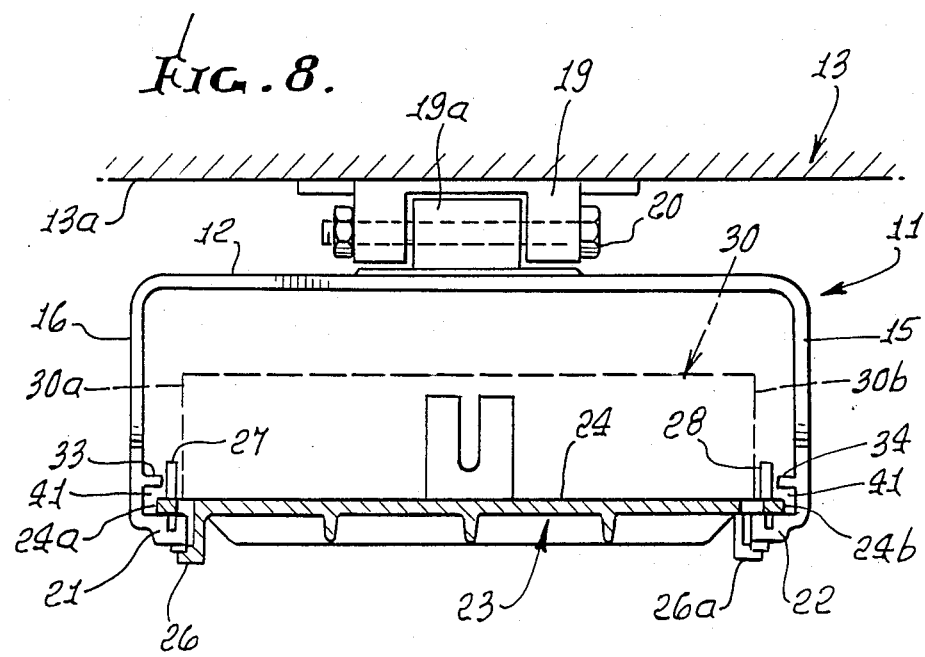
FIG. 8 is a section, in elevation, on lines 8—8 of FIG. 3.

The lower extents of the side walls are turned inwardly to provide tray support flanges 21 and 22, as seen in FIG. 8. A tray 23 is supported by the carrier, as on the two flanges 21 and 22, for tray movement between forwardly extended (FIGS. 2 and 3) positions, and rearwardly retracted (FIGS. 1 and 5) positions. The tray typically has a bottom wall 24 with opposite extents 24a and 24b slidably supported on the flanges 21 and 22. Also, the tray has L-shaped downward projections 26 and 26a that are carried by bottom wall 24 and that extend beneath the flanges to block lifting of the tray relative to the carrier. The tray also includes upright, forwardly and rearwardly extending rails 27 and 28 projecting above the bottom wall extents 24a and 24b to provide a space therebetween to closely fit opposite sides 30a and 30b of a compact disc player housing 30. Bottom wall extents 24a and 24b also are received beneath laterally inward, forwardly and rearwardly extending flanges 33 and 34 integral with the carrier side walls. The tray bottom wall inner end has sliders 35 thereon (see FIG. 3) adapted to slidably fit closely against the flanges 33 and 34.

The forward extent 36 of the tray projects upwardly above the bottom wall, at 36a, and to a height at 36b corresponding to the upper edges of the carrier side walls 15a and 16a. Forward extent 36 also projects downwardly at 36c to provide a lip at 36d to be finger grasped for tray pull-out. Front wall 36a is forwardly convex as shown and may be indented or recessed at 37, for thumb grasping. Rearward edge 36e of the tray forward extent 36 are adapted to register with and engage the forward edges 15c and 16c of walls 15 and 16, to stop tray closing. A downward abutment 39 from the tray bottom wall is engageable with a downward lug 40 on the carrier bottom wall to limit forward opening or slide-out of the tray. The space 41 between the flange 21 and flange 33, as well as space 41 between flange 22 and flange 24 tapers in a rearward direction to grip the slides 35 and bend item downwardly to functionally lock the tray in closed position, for retention as in FIG. 5.

The compact disc player 42 located within the housing is conventional in design and operation, and is well known. One example is Model SL - XP5 made by Technics, Div. of Matsushita, Japan.

The compact disc itself is indicated at 43, in FIG. 2. In tray extended position, as seen in FIGS. 2 and 3, the compact disc is exposed for removal, whereas in tray retracted position, the disc is substantially concealed by the carrier. In this regard, a cover 44, which may be considered as part of the disc housing, is hinged to tilt upwardly and rearwardly in tray extended position, as seen in FIG. 2, to give access to the disc; whereas in tray retracted position, the cover is closed down onto the remainder of the disc housing. On the other hand, the player controls, indicated at 45 and 46 are fully accessible in both extended and retracted positions of the tray, the tray and carrier providing an effective side "cut-out" to provide access to on-off and volume controls at the side of the player. Typically, the player cover or lid 44 is closed down, as seen in FIG. 1, while the tray is moved toward or from tray extended position. Inadvertent attempts to lift the cover 44 in tray retracted position are blocked by cover engagement with the carrier edge extent 12a.

In accordance with an important aspect of the invention, switching circuitry is associated with the carrier and has terminals electrically connectible with:
 (i) speaker circuitry on the vehicle,
 (ii) audio circuitry on the vehicle,
 (iii) and an output connection on the compact disc player.

Further, that switching circuitry is manually or automatically operble to have a first or static position in which the audio circuitry (as for example a car radio) is connected with the vehcile speaker circuitry; and a second and alternate position in which the compact disc player output connection is then connected with the speaker circuitry on the vehicle. Accordingly, the user can quickly switch either way, i.e. to obtain either radio or other audio (stereo for example) programming on the vehicle speaker system, or compact disc player output on his vehicle speaker, and at the same time his player remains housed as discussed above. Also, if his compact disc player is playing, i.e. the on-off control at 46 is "ON", the user can quickly switch by means of the referenced alternate switching circuitry to his radio output, and back and forth at any time, using only that one alternate switch.

See for example FIG. 9 wherein switching circuitry is indicated by block 50 within which a switcher 51 is shown as having output at 52 to a vehicle speaker circuit input 52. The circuitry 50 has an input at 53 from the output 54 of portable CD player 42, described above; and the circuitry 50 has a second input at 55 from the vehicle stereo preamplifier 56. Circuitry 50 may include a pre-amplifier at 57 between 53 and 51. Power input is indicated as including a 12 volt supply 58, DC power converter 59 within circuitry 50, and voltage regulator 60 connected at 61 and 62 with 42 and 51. Thus, the switcher circuitry may be provided with suitable connections at 52, 53, 55, 58 and 61. In simplified form, the switcher 51 includes a switch arm 51a connected with 52, and connectible with either one of the two contacts 51b and 51c, the former connected to 42 and the latter to 56.

In FIG. 10, switching circuitry indicated by block 60 includes a switcher 61 having output at 61a to vehicle wiring harness 62 representative of vehicle speaker circuitry. The block 60 has an input at 63 from output at 54 of the portable compact disc player 42. Circuitry 60 has a second input at 65 from a vehicle radio, as via a Delco Bose (or other) radio connector 66, for example. A pre-amplifier 57 is employed within 60 with a voltage selector 67, to which power is supplied via line 68 from harness 62, for supply on line 69 to the radio and on line 69a to the units 54 and 57.

In FIG. 11, the circuitry is similar to FIGS. 9 and 10, except that the switcher 70a switches between the output of CD player 42, and the output at 71 of an auto stereo unit 72, for selected audio signal delivery at 73 to the auto stereo amplifier 74 and then to the auto speaker 75. Power is supplied at 76, 77 and voltage selector 78.

The circuitry in any of the blocks 50, 60 and 70 may be associated with the carrier 11; for example, it may be located at position 80 seen in FIG. 3, i.e. at the rear of the carrier, and have terminals indicated at 81 for establishing the connections indicated at 52, 55 and 58 in FIG. 0. Also, it has jack connections indicated at 53a and 61a to connect to the portable CD player 42 when the latter is placed into position in the tray, as via a flexible cable and plugs. Broken line 42a in FIG. 3 indicates an appropriate receptacle to receive the jacks, which correspond to connections 53 and 61, in FIG. 9. Other arrangements and location of circuitry 50, 60 and 70 are possible.

The element 51a, 51b and 51c may be conveniently located, in association with the apparatus and/or the instrument panel.

In FIG. 5, a cantilevered, upwardly biased slides 35 is shown projecting rearwardly beyond the rearward end 33a of flange 33, to lock the tray in retracted position. Forward pulling of the tray serves to unlock the slides by camming it beneath the flange or rail 33.

In FIG. 3, the fastener 20 may be loosened to enable tilting of bracket 18 relative to bracket 19, and corresponding tilting of the carrier and tray, for optional positioning thereof.

I claim:

1. In a vehicle audio system having speaker circuitry, and audio circuitry, the combination comprising:
 (a) a carrier, and means thereon to attach the carrier to a vehicle instrument panel to be supported by the panel,
 (b) a tray supported by the carrier for movement between extended and retracted position relative to the carrier and instrument panel,
 (c) a compact disc player supported by the tray for movement therewith between said extended position in which a compact disc carried by the player is positioned for removal, and said retracted position in which the disc is normally substantially concealed, the player having an output connection,
 (d) a switching circuit associated with the carrier and having terminals electrically connectible with:
  (i) said speaker circuitry,
  (ii) said audio circuitry, and (iii) the player output connection,
(e) the switching circuitry being manually or automatically operable.

2. The combination of claim 1 wherein said audio circuitry comprises stereo circuitry, the switching circuitry at least partly concealed within said carrier, to be connected with the player placed in the tray.

3. The combination of claim 1 wherein said audio circuitry comprises radio circuitry, the switching circuitry at least partly concealed within said carrier, to be connected with the player placed in the tray.

4. The combination of claim 1 wherein said carrier comprises a forwardly and rearwardly elongated housing having upper and lower generally horizontal walls, a rear wall and side walls, the lower wall projecting forwardly to substantially greater extent than said upper wall, the tray supported to move forwardly and rearwardly above said lower wall so that the player supported thereby becomes substantially concealed below said upper wall of the housing in said tray retracted position, but player controls, at the forward end of the player, remain directly accessible in both retracted and extended positions of the tray.

5. The combination of claim 4 wherein said switching circuitry is concealed by the carrier, rearwardly of the tray in tray retracted position.

6. The combination of claim 5 including electrical lead means within the carrier and extending from said switching circuitry for operative connection with the player.

7. The combination of claim 4 wherein the player includes a top closure which is only tiltable upwardly in tray retracted position, the carrier blocking said upward tilting in tray retacted position.

8. The combination of claim 4 wherein one side of the tray and the side wall of the carrier have reduced heights adjacent a compact disc player received in the tray to sidewardly expose an on-off control and volume control on the player when the tray is in both extended and retracted positions.

9. The combination of claim 1 wherein said means to attach the tray to the instrument panel includes, relatively tiltable brackets and a fastener to lock the brackets in selected relatively tilted positions, thereby to control tilt of the carrier, tray and player, relative to the instrument panel.

10. The combination of claim 1 including cantilever means carried by the tray to releasably lock to the carrier in retracted position of the tray.

11. The combination of claim 1 wherein the switching circuitry has a first position in which the audio circuitry is connected with the speaker circuitry, and a second and alternate position in which the player output connection is connected with the speaker circuitry.

* * * * *